(12) United States Patent
Sweeney

(10) Patent No.: US 8,630,670 B2
(45) Date of Patent: *Jan. 14, 2014

(54) PERMISSION BASED TEXT MESSAGING

(71) Applicant: Destine Systems Co. L.L.C., Dover, DE (US)

(72) Inventor: Robert J. Sweeney, Parkville, MO (US)

(73) Assignee: Destine Systems Co. L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,433

(22) Filed: Feb. 25, 2013

(65) Prior Publication Data
US 2013/0165167 A1 Jun. 27, 2013

Related U.S. Application Data

(63) Continuation of application No. 13/242,581, filed on Sep. 23, 2011, now Pat. No. 8,385,955, which is a continuation of application No. 11/726,896, filed on Mar. 23, 2007, now Pat. No. 8,046,012, which is a continuation of application No. 11/047,155, filed on Jan. 31, 2005, now Pat. No. 7,197,324.

(51) Int. Cl.
H04W 4/00 (2009.01)
H04L 29/06 (2006.01)
H04M 3/00 (2006.01)

(52) U.S. Cl.
USPC .................. 455/466; 455/414.3; 455/419

(58) Field of Classification Search
USPC ........................ 455/466, 414.3, 419
See application file for complete search history.

(56) References Cited

U.S. PATENT DOCUMENTS

| | | | |
|---|---|---|---|
| 6,289,223 B1 | 9/2001 | Mukherjee et al. |
| 6,338,140 B1 | 1/2002 | Owens et al. |
| 6,366,791 B1 | 4/2002 | Lin et al. |
| 6,430,409 B1 | 8/2002 | Rossmann |
| 6,741,856 B2 | 5/2004 | McKenna et al. |
| 6,819,932 B2 | 11/2004 | Allison et al. |
| 6,834,195 B2 | 12/2004 | Brandenberg et al. |
| 6,944,447 B2 | 9/2005 | Portman et al. |
| 6,993,658 B1 | 1/2006 | Engberg et al. |
| 6,996,393 B2 | 2/2006 | Pyhalammi et al. |

(Continued)

FOREIGN PATENT DOCUMENTS

| | | |
|---|---|---|
| WO | 97/41654 | 11/1997 |
| WO | 2004/100470 | 11/2004 |

OTHER PUBLICATIONS

Personalize Your Mobile Phone with Text Messaging, SMSMG.com: Mobile Alerts, http://web.archive.orglweb/20040328012731/http:/lsmsmg.com, Mar. 28, 2004, 2 pages. [Retrieved Jul. 6, 2007].

(Continued)

Primary Examiner — Christopher M Brandt

(57) ABSTRACT

A user may receive one or more text messages after the user is authorized. The potential user can opt in through a web page in one embodiment. Once the potential user sends an initial request, the user may receive a first text message containing an authorization code on their mobile phone. The user may enter the authorization code back to a web page. Receipt of the authorization code may trigger the phone number of the potential user to be added to a list of authorized text message receivers. One or more text messages may then be sent to authorized phone numbers on the list.

20 Claims, 6 Drawing Sheets

(56) References Cited

U.S. PATENT DOCUMENTS

| | | |
|---|---|---|
| 7,024,211 B1 | 4/2006 | Martin |
| 7,054,626 B2 | 5/2006 | Rossmann |
| 7,107,068 B2 | 9/2006 | Benzon et al. |
| 7,113,981 B2 | 9/2006 | Slate |
| 7,142,840 B1 | 11/2006 | Geddes et al. |
| 7,174,005 B1 | 2/2007 | Rodkey et al. |
| 7,197,297 B2 | 3/2007 | Myles et al. |
| 7,218,918 B1 | 5/2007 | Alston |
| 7,218,921 B2 | 5/2007 | Mendiola et al. |
| 7,242,923 B2 | 7/2007 | Perera et al. |
| 7,245,902 B2 | 7/2007 | Hawkes |
| 7,308,498 B1 | 12/2007 | Olsen et al. |
| 7,555,265 B2 | 6/2009 | Uchiyama |
| 7,912,457 B2 | 3/2011 | Chandhok et al. |
| 2001/0047294 A1 | 11/2001 | Rothschild |
| 2002/0029342 A1 | 3/2002 | Keech |
| 2002/0037716 A1 | 3/2002 | McKenna et al. |
| 2002/0090934 A1 | 7/2002 | Mitchelmore |
| 2002/0107002 A1 | 8/2002 | Duncan et al. |
| 2002/0111907 A1 | 8/2002 | Ling |
| 2002/0123359 A1 | 9/2002 | Wei et al. |
| 2002/0164977 A1 | 11/2002 | Link, II et al. |
| 2003/0036396 A1 | 2/2003 | Back et al. |
| 2003/0087652 A1 | 5/2003 | Simon et al. |
| 2003/0100337 A1 | 5/2003 | Chotkowski et al. |
| 2003/0191691 A1 | 10/2003 | Macleod |
| 2003/0195009 A1 | 10/2003 | Endo |
| 2004/0038690 A1 | 2/2004 | Lee et al. |
| 2004/0140989 A1 | 7/2004 | Papageorge |
| 2004/0143550 A1 | 7/2004 | Creamer et al. |
| 2004/0180683 A1 | 9/2004 | Dennis et al. |
| 2004/0191339 A1 | 9/2004 | Bibb |
| 2004/0203903 A1 | 10/2004 | Wilson et al. |
| 2004/0224693 A1 | 11/2004 | O'Neil et al. |
| 2004/0247090 A1 | 12/2004 | Nurmela |
| 2004/0248600 A1 | 12/2004 | Kim |
| 2005/0049022 A1 | 3/2005 | Mullen |
| 2005/0050144 A1 | 3/2005 | Borin |
| 2005/0160038 A1 | 7/2005 | Albornoz |
| 2005/0288044 A1 | 12/2005 | Atkins et al. |
| 2006/0002556 A1 | 1/2006 | Paul |
| 2006/0003694 A1 | 1/2006 | Quelle |
| 2006/0004632 A1 | 1/2006 | Kelsen et al. |
| 2006/0058048 A1 | 3/2006 | Kapoor et al. |
| 2006/0100898 A1 | 5/2006 | Pearce et al. |
| 2006/0131390 A1 | 6/2006 | Kim |
| 2006/0179304 A1 | 8/2006 | Han |
| 2006/0180660 A1 | 8/2006 | Gray |
| 2007/0088952 A1 | 4/2007 | Hewitt et al. |
| 2007/0288392 A1 | 12/2007 | Peng et al. |
| 2008/0086379 A1 | 4/2008 | Dion et al. |
| 2008/0263169 A1 | 10/2008 | Brabec et al. |
| 2009/0048938 A1 | 2/2009 | Dupray |

OTHER PUBLICATIONS mPrivacy Policies, http://web.archive.orglweb/20040228033734/http://www.mprivacy.com/privacy.html, Feb. 28, 2004, 3 pages. [Retrieved Jul. 6, 2007].

Office Action in U.S. Appl. No. 11/726,896 issued Nov. 30, 2009, 12 pages.

Response to Office Action in U.S. Appl. No. 11/726,896 issued Nov. 30, 2009, mailed Mar. 3, 2010, 13 pages.

Office Action in U.S. Appl. No. 11/726,896 issued May 12, 2010, 13 pages.

Response to Office Action in U.S. Appl. No. 11/726,896 issued May 12, 2010, mailed Jul. 12, 2010, 11 pages.

Office Action in U.S. Appl. No. 11/726,896 issued Jan. 20, 2011, 8 pages.

Response to Office Action in U.S. Appl. No. 11/726,896 issued Jan. 20, 2011, mailed Apr. 7, 2011, 10 pages.

Office Action in U.S. Appl. No. 11/047,155 issued Aug. 14, 2006, 14 pages.

Response to Office Action in U.S. Appl. No. 11/047,155 issued Aug. 14, 2006, mailed Nov. 7, 2006, 16 pages.

Office Action in U.S. Appl. No. 13/242,581 issued Feb. 17, 2012, 14 pages.

Response to Office Action in U.S. Appl. No. 13/242,581 issued Feb. 17, 2012, mailed May 16, 2012, 11 pages.

Office Action in U.S. Appl. No. 13/242,581 issued Aug. 8, 2012, 19 pages.

Response to Office Action in U.S. Appl. No. 13/242,581 issued Aug. 8, 2012, mailed Sep. 28, 2012, 11 pages.

Figure 2

WELCOME TO THE CMSU SPORTS CONNECTION

GET WIRELESS UPDATES ON ALL CMSU SPORTS SENT TO YOUR MOBILE PHONE — 200

Get even better connected with CMSU Sports. With CMSU Sports Connection, stay up-to-date with your favorite Mules & Jennies sports. Choose the information you want and have scores & updates sent to your mobile phone as a text message.

SIGN-UP TODAY - IT'S FREE

CMSU SPORTS CONNECTION TEXT MESSAGE CATEGORIES INCLUDE:

CMSU All-Sports Update - Select this category and get sports scores and updates for all the CMSU sports teams. Just check this one box during sign-up and you'll be updated on all CMSU sports!
Cross Country - Stay updated with updates and results from the CMSU Cross Country team. — 121
Jennies Basketball - Get scores and updates for Jennies Basketball.
Jennies Bowling - Get results & updates about the Jennies Bowling team.
Jennies Soccer - Get scores and updates on Jennies Soccer.
Jennies Softball - Get scores and updates on the Jennies Softball team.
Jennies Volleyball - Get results and updates about the Jennies Volleyball team.
Mules Baseball - Get scores and updates on Mules Baseball.
Mules Basketball - Get scores and updates on Mules Basketball.
Mules Football - Get scores and updates on Mules Football.
Mules Golf - Get results for Mules Golf.
Mules Wrestling - Get results for Mules Wrestling.
Track & Field - Get results and updates on CMSU Track & Field.

SIGN-UP TODAY FOR CMSU SPORTS CONNECTION - IT'S FREE!

STEP 1: SIGN-UP - TEST YOUR PHONE

The first step in subscribing is making sure your mobile phone can receive text messages. Please complete the information below, and we will send a personal authorization code via text message to your mobile phone. Enter this code during the next step to continue. If you would like to receive email messages, please enter your email address.

Name: _____ * Required — 131
Timezone: [(GMT-05:00) Eastern Time (US & Canada) ▼] — 132
Mobile Number: _____ * Required — 133
Carrier: [Select Wireless Carrier ▼] — 134
Email: _____ (Optional) — 135
Zip Code: _____ * must be 5 digits — 136
send authorization code 139 — [unsubscribe]    [submit] — 138

Figure 3

An Authorization Code has been sent as a text message to your mobile phone. This part of the sign-up process fights SPAM and the unauthorized sending of text messages to people without their knowledge. When you receive your Authorization Code, please enter it into the box below. Then, choose the message group(s) you wish to receive. Finally, click on the SUBSCRIBE NOW button and you're finished.

— 300

STEP 2: ENTER YOUR AUTHORIZATION CODE

Please enter the authorization code that was sent to your mobile phone.

Authorization Code: [       ]  225

[ subscribe ]  — 320

PERMISSION BASED TEXT MESSAGING

RELATED APPLICATIONS

The present application is a continuation of U.S. application Ser. No. 13/242,581, filed Sep. 23, 2011 (to be issued as U.S. Pat. No. 8,385,955), which is a continuation of U.S. application Ser. No. 11/726,896, filed Mar. 23, 2007 (now U.S. Pat. No. 8,046,012), which is a continuation of U.S. application Ser. No. 11/047,155, filed Jan. 31, 2005 (now U.S. Pat. No. 7,197,324); the disclosures of each of the above-referenced applications are incorporated by reference herein in their entireties.

BACKGROUND OF THE INVENTION

In the communications industry it is often desirable to be able to narrowcast a message that will be received instantly by a large number of people such as potential customers or people who may need to be aware of an emergency situation. Care must be taken not to offend the potential customer or others with unwanted messages such as unsolicited product offerings.

Patent application 2004/0247090 discloses an alert system capable of formatting a message and sending that alert message out over a variety of platforms including text messaging to cell phones. This system uses a database of potential recipients of the message. The problem with the system is that the recipients may not want to receive the message. Even if they are potentially interested in the message, they may be confused as to why they have received the message and may delete the message because they don't know what the message is or why they are receiving it. The public at large has grown wary of unsolicited offers coming by traditional mail, phone, text message and by email. Selling of customer lists and unwanted offers and information can lead to a backlash such as the recent 'no-call' lists in the telemarketing industry. The so called "can-spam" law was put in place to protect consumers against unwanted text messages for example.

Patent application 2004/018683 discloses a system of communicating so called "Amber" alerts to a mobile work force. This system narrowcasts an alert to a closed community of company workers. While those workers may be more receptive to receiving the messages narrowcast, this system still does not suggest a solution to reaching an audience in the general public that is receptive to the information being sent.

As can be seen there is a need for a narrowcast communications system that will allow information to reach the public quickly and efficiently but that information must be wanted by the recipients such that there is no resentment towards the sender.

SUMMARY OF THE INVENTION

The present invention relates to a narrowcast communications system that allows a message to be narrowcast to a receptive audience in the general public that is prepared to receive that message. However, this application is targeted at a method and system that can be called "Narrowcasting". Unlike broadcasting, narrowcasting sends a message to a target audience of potential receivers that have given permission to have the message sent to their cell phone. The present invention further provides for a narrowcast communication system wherein a person can opt in to receive text messages narrowcast from a central location. The person can opt in, for example, by going to a participating web page and clicking on an icon to bring up an application to sign up for text messages. The application may include a variety of potential topics that the potential user may select. The user then can input into the application a cellular phone number and an email address and also select the message category they wish to receive.

The present invention further includes a method for narrowcasting text messages to plurality of cellular phones including the steps of receiving, over a computer network, a request to receive text messages. After the sign up request is received, an authorization code is sent to a cellular phone number received in said request and verifying the authorization code has been received. Then adding the authorized cellular phone number to a list of authorized phone numbers, and placing a text message call to at least a portion of the list of authorized phone numbers.

These and other advantages of the present invention will become apparent from the detailed description of the invention.

BRIEF DESCRIPTION OF THE DRAWINGS

FIG. 2 shows a screen shot of a portion of the system of the present invention;

FIG. 3 shows a screen shot of a portion of the system of the present invention;

DETAILED DESCRIPTION OF THE DEVICE

Sending text messages to cellular phones has become a common way to communicate. It is possible to narrowcast a single message to a plurality of cellular phone users. This application is targeted at a method and system that can be called "Narrowcasting". Unlike broadcasting, narrowcasting sends a message to a target audience of potential receivers that have given permission to have the message sent to their cell phone and/or email. For the purposes of this application 'narrowcasting' means sending a text message and/or email to receivers who have given permission.

Figure 1:
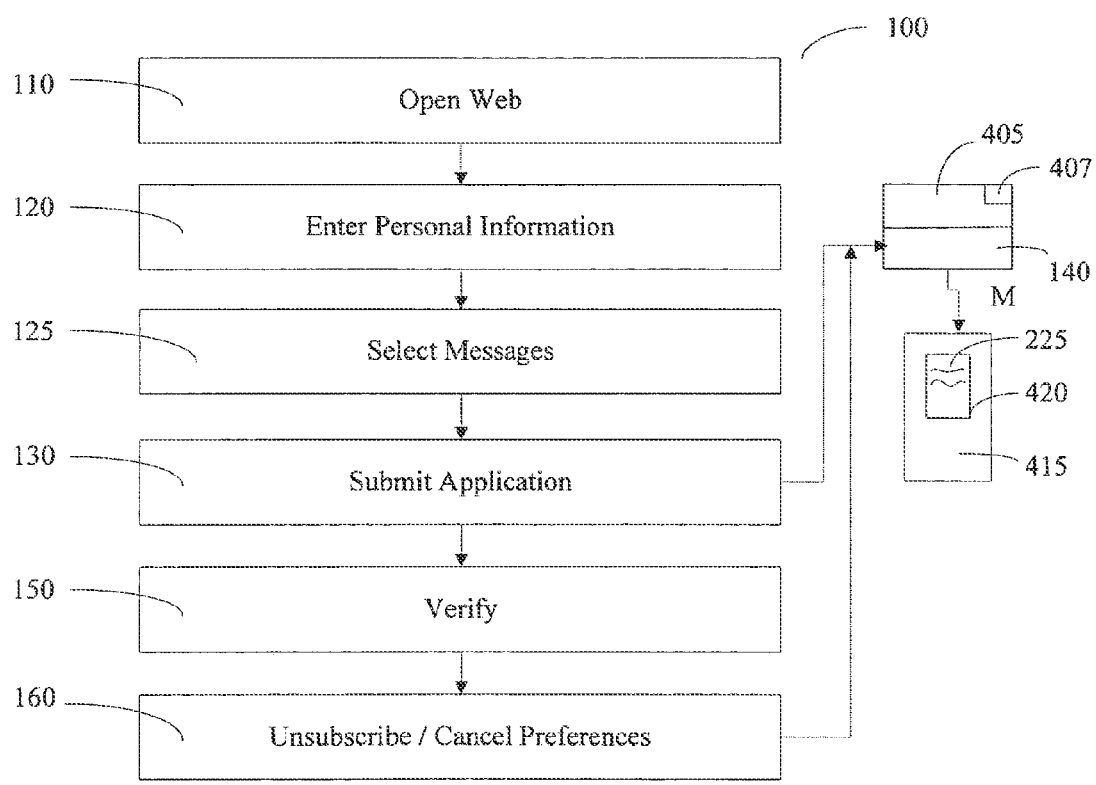
FIG. 1 shows a flow diagram of a portion of the present invention.

FIGS. 1 and 2 show a flow chart of the permission process 100 of how a customer who would typically be remote from a central computer 405, can take the option and give permission to receive text messages from the central computer 405. The potential system user can open 110 the web page, see FIG. 2 for a computer screen shot of the web page based application 200. The potential user can then enter 120 personal contact information and select 125 message topics from a field of possible message topics (121 in FIG. 2). FIG. 2 shows a screen shot of application 200 of the application process as applied to a University sports organization where a potential user can select from a field of possible message topics 121 of sports events as an example. Once the potential user has entered 120 the message topics 121 they want and submitted 130 the application 200, the application 200 can be submitted over a network N to a central computer 405 that includes a database 407 to store information such as a list of authorized cell phone numbers. The central computer 405 will, after a moment delay, send 140 the potential user a message M containing an authorization code 225 to their cell phone 415 for display on cell phone screen 420. Sending 140 the authorization code 225 contained in text message M serves two purposes, it demonstrates the technology to the potential user so that they can see immediately that the system is working to ensure the user's phone is text enabled. It also provides a loop for the user to verify 150 their desire to opt in to the system by entering the authorization code 225 they receive in the text message M back into the opt-in web page, see screen shot FIG. 3. This can prevent unauthorized permission, for example where an unauthorized person might attempt to enroll a person who has not given permission. The unauthorized person would not only need to know the cell phone number but would also need to be in possession of the phone 415 to return the authorization code 225. FIG. 1 also shows that the permission process 100 can include an option for the person to unsubscribe 160 or change message preference. Thus a user can return to the permission process 100 at a later time and unsubscribe 160 from receiving the narrowcast messages M or change message topics 121. FIG. 2 shows that a user can unsubscribe by clicking button 139.

Figure 4:
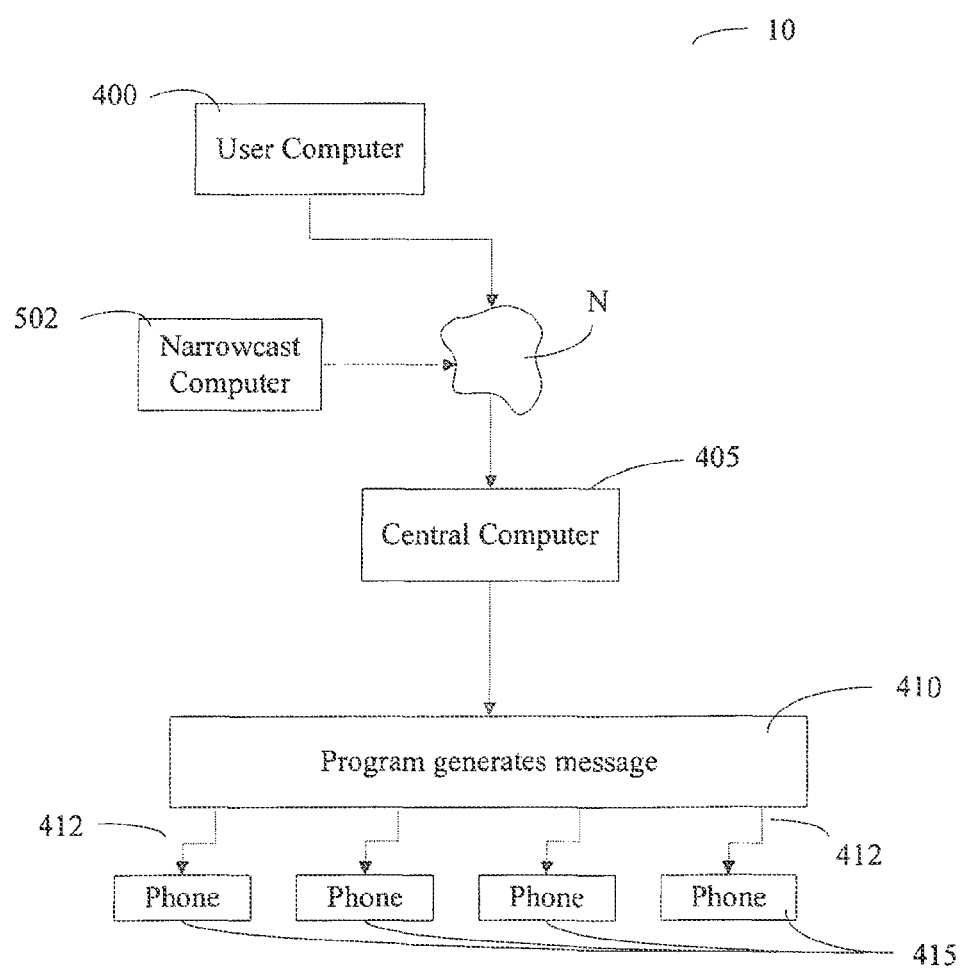
FIG. 4 shows a second flow diagram of a portion of the present invention.

FIG. 2 shows a screen shot of application 200 of the user intake web page as it might be displayed on a user computer 400 (see FIG. 4). The application 200 covers the steps 110, 120, 125 and 130 in FIG. 1. The user can select 125 from a field of topic choices 121. In this case the choices 121 are college athletic teams but could be any topic choice. The application 200 then prompts for personal information such as name 131, timezone 132, mobile or cellular number 133, Carrier 134, email 135 and zip code 136. Once this information 121 and 131-136 is entered the user actually submits the information 121 and 131-136 using a submit button 138. Once submitted via network N such as the Internet, the information 121 and 131-136 will arrive at a central computer (405 FIG. 4). The central computer 405 can then send message M containing an authorization code 225 to the cell phone 415 of the potential user. Once submitted the user computer 400 screen will change from application 200 to authorization 300 to that shown in FIG. 3. Later a person returning to the application 200 can unsubscribe 139 to stop receiving messages from some or all of the topics 121 initially chosen. A user can also return to application 200 later and add additional topics 121 or delete unwanted ones.

FIG. 3 shows a screen shot of the authorization web page 300. The user will be prompted to enter the authorization code 225 that they receive on their cell phone 415 from the central computer 405. The user can then complete the authorization process by clicking the subscribe 320 button. The authorization is then sent from the user's computer (400 FIG. 4) to the central computer 405 via the Internet.

FIG. 4 shows a view of the system 10 which can include a user computer 400 that allows the user to opt into the system 10 through a network N such as the Internet. A central computer 405 which contains the opt in application forms shown in FIGS. 2 and 3. The central computer 405 can include a program 410 to generate and narrowcast text messages 412 to user phones 415 of people who have opted in to receive messages 412. The system can also include a narrowcaster computer 502 where a third party narrowcaster can generate messages to be sent to authorized users and the messages can be forwarded to the central computer 405 to be transmitted. For example, a university may be a third party that wishes to narrowcast messages such as university team scores for sporting events to willing alumni. In this example, the university narrowcaster computer 502 would create a message that would be forwarded through the internet N to the central computer 405 to be transmitted to the cellular phones 415 of alumni who have expressed a willingness to receive the score messages.

Figure 5:
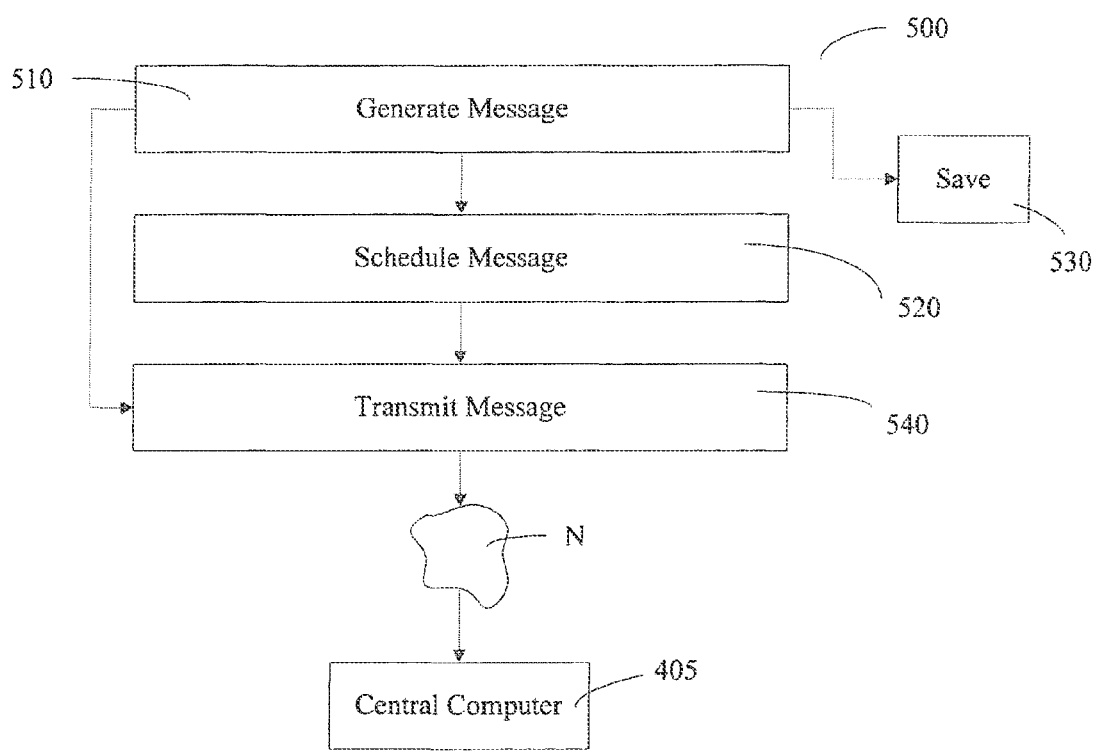
FIG. 5 shows a third flow diagram of a portion of the present invention.

FIG. 5 shows the narrowcast text messages process 500, a narrowcaster might use to narrowcast text messages 412 to a number of users who have given permission to receive the text message 412. The narrowcaster first generates 510 a message 412 to be narrowcast. The generation step 510 can include inputting characters into a text message box 602 (see FIG. 6). The message 412 can be sent immediately or scheduled 520 for narrowcast at a specific time and date. The message can be scheduled 520 for recurring transmission such as daily or monthly. The narrowcaster can save 530 the message 412 for future use and transmit 540 the message. Many narrowcasters will not actually have a computer system to transmit multiple text messages or email. Rather the transmit 540 step will involve sending the message 412 over a computer network N to the central computer 405 where the phone numbers of the phones 415 authorized to receive the message 412 can be stored.

Figure 6:
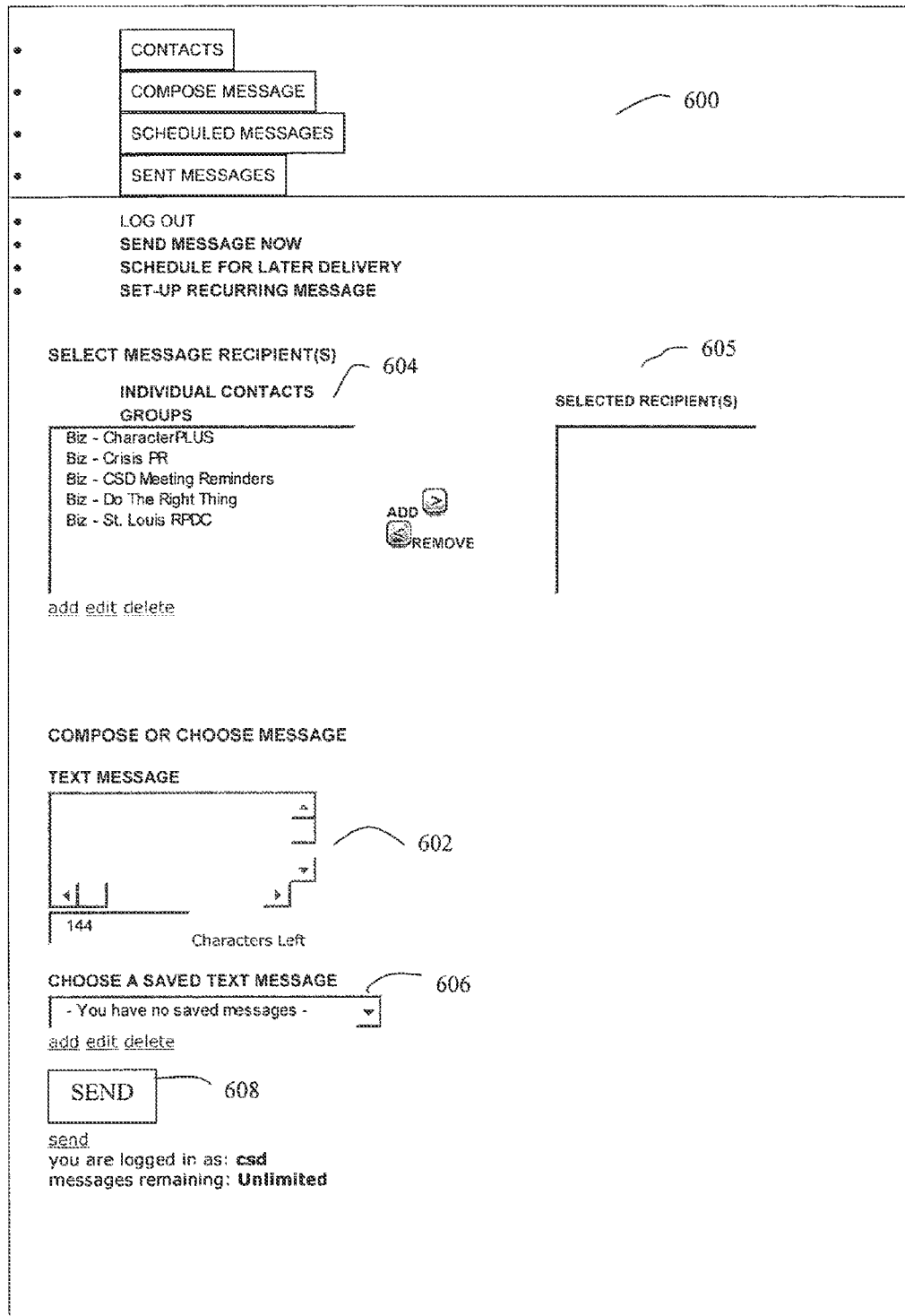
FIG. 6 shows a screen shot of the process for message creation and narrowcasting.

FIG. 6 shows a screen shot 600 containing some of the details of the narrowcast text messages process 500. The screen 600 can include a text box 602 to compose a message 412 to be sent. The narrowcaster can select message recipients 605 that can include authorized individuals or groups of individuals who might receive a message 412. The narrowcaster can also select the option of saving 606 a message 412 and can choose to send 608 a message 412 from screen 600. When the narrowcaster selects send 608, the narrowcaster's computer will contact the central computer 405 through the network N and the central computer 405 will send the generated text message 412 to the recipients 605 selected from a list of all authorized recipients 604. The text message 412 will be sent essentially simultaneously to all cellular phones 415 on the list 605 of recipients.

In use, a potential user learns of the possibility of receiving one or more text messages 412 on a topic they are interested in such as scores of a sports team at their school. The potential user can be directed to a web page where the user can complete an on-line application 200 and submit the on-line application 200 via the network N such as the Internet. A central computer 405 receives the on line application 200 and can send an authorization code 225 in a text message M to the cell phone number indicted in the online application 200. The potential user must then authorize the online application 200 by sending the authorization code 225 back over the Internet N to the central computer 405. Authorization can occur through a separate authorization web page 300. Although the preferred process shows a web site, it would be possible for the potential user to send a request via email, to receive the authentication code back on their cell phone and then to send a second email to verify the authorization code 225. Either method verifies that the person asking for permission actually possesses the cell phone being authorized to receive messages 412.

While the invention has been described in reference to a preferred embodiment, it is not necessarily limited to the particulars set forth. On the contrary, it is intended to cover such alternatives, modifications and equivalents as set forth in the spirit and scope of the invention as defined by the appended claims.

The invention claimed is:
1. A method, comprising:
a computer system receiving subscription preference information for a plurality of future text messages to be transmitted to a phone number that corresponds to a communication device;
in response to receiving the subscription preference information, the computer system causing a text message that is addressed to the phone number and includes an authorization code to be sent to the communication device;

in response to the computer system receiving input that includes the authorization code, and based on the received subscription preference information, the computer system causing permission information to be stored on a storage device, wherein the permission information indicates permission to cause the plurality of future text messages to be transmitted to the communication device.

2. The method of claim 1, further comprising the computer system receiving the subscription preference information via a web page served by the computer system.

3. The method of claim 1, wherein the subscription preference information indicates one or more subject categories about which a user has indicated a willingness to receive as content of the plurality of future text messages.

4. The method of claim 3, wherein at least one of the one or more subject categories relates to sports updates.

5. The method of claim 1, further comprising the computer system receiving additional subscription preference information, and storing a corresponding list of phone numbers that are authorized to receive individual ones of the plurality of future text messages.

6. The method of claim 1, further comprising:
the computer system receiving specific content for a first one of the plurality of future text messages subsequent to the permission information being stored; and
the computer system causing the first text message, including the specific content, to be transmitted to the communication device.

7. The method of claim 1, wherein at least a first one of the plurality of future text messages are targeted to users associated with a specific geographic area.

8. The method of claim 7, wherein the geographic area is indicated by a zip code provided by a user via a web page.

9. The method of claim 1, further comprising the computer system causing text messages to be sent to a plurality of communication devices, wherein communication with each of the plurality of communication devices has been authorized via a respectively received plurality of authorization codes.

10. The method of claim 1, further comprising the computer system unsubscribing the communication device from receiving additional text messages.

11. A system, comprising:
a processor; and
a memory, wherein the memory has stored thereon instructions that are executable by the processor to cause the system to perform operations comprising:
receiving a phone number that corresponds to a communication device and information indicating a request to receive one or more future text messages at the phone number that corresponds to the communication device;
in response to said receiving, causing a text message that is addressed to the phone number and includes an authorization code to be sent to the communication device; and
in response to the system receiving input that includes the authorization code, and based on the information indicating the request to receive the one or more future text messages, causing permission information to be stored on a storage device, wherein the permission information indicates permission to cause the one or more future text messages to be transmitted to the communication device.

12. The system of claim 11, wherein the system is configured as a web server, and wherein the phone number and the information indicating the request to receive the one or more future text messages are received via one or more web pages provided by the system.

13. The system of claim 11, wherein the operations further comprise generating the authorization code in response to receiving the phone number and the request to receive the one or more future text messages.

14. The system of claim 11, wherein the operations further comprise receiving a selection of at least one of a plurality of subject categories, wherein the one or more future text messages relate to the selected subject category.

15. The system of claim 11, wherein the system comprises two or more computer systems connected via a network.

16. A non-transitory computer-readable storage medium having instructions stored thereon that are executable by a computer system to cause the computer system to perform operations comprising:
receiving subscription preference information for a plurality of future text messages to be transmitted to a phone number that corresponds to a communication device;
in response to receiving the subscription preference information, causing a text message that is addressed to the phone number and includes an authorization code to be sent to the communication device;
in response to receiving input that includes the authorization code, and based on the received subscription preference information, causing permission information to be stored on a storage device, wherein the permission information indicates permission to cause the plurality of future text messages to be transmitted to the communication device.

17. The non-transitory computer-readable storage medium of claim 16, wherein the operations further comprise receiving the subscription preference information via a web page served by the computer system.

18. The non-transitory computer-readable storage medium of claim 16, wherein the operations further comprise modifying the permission information to indicate that a user of the portable communication device has consented to receive one or more different future text messages corresponding to a different subject category than a subject category relating to the plurality of future text messages.

19. The non-transitory computer-readable storage medium of claim 16, wherein the stored permission information comprises at least a portion of the received subscription preference information.

20. The non-transitory computer-readable storage medium of claim 16, wherein the operations further comprise scheduling a future transmission of at least one of the plurality of future text messages for a particular time.

\* \* \* \* \*